United States Patent
Arnold et al.

(10) Patent No.: US 9,277,690 B2
(45) Date of Patent: Mar. 8, 2016

(54) HAYMAKING DEVICE

(75) Inventors: Martin Arnold, Steinlah (DE); Cornelis Christianus Franciscus Havermans, Zevenbergen (NL)

(73) Assignee: FORAGE INNOVATIONS B.V., Maassluis (NL)

( * ) Notice: Subject to any disclaimer, the term of this patent is extended or adjusted under 35 U.S.C. 154(b) by 230 days.

(21) Appl. No.: 13/606,036

(22) Filed: Sep. 7, 2012

(65) Prior Publication Data

US 2013/0118141 A1    May 16, 2013

Related U.S. Application Data

(63) Continuation of application No. PCT/NL2011/000015, filed on Mar. 4, 2011.

(30) Foreign Application Priority Data

Mar. 8, 2010  (NL) ..................................... 1037784

(51) Int. Cl.
*A01D 78/00*  (2006.01)
*A01D 78/10*  (2006.01)

(52) U.S. Cl.
CPC ........ *A01D 78/1014* (2013.01); *A01D 78/1007* (2013.01)

(58) Field of Classification Search
USPC ........... 56/365, 367, 370, 378–380, 384, 385, 56/396
See application file for complete search history.

(56) References Cited

U.S. PATENT DOCUMENTS

| | | | | |
|---|---|---|---|---|
| 4,026,093 A | * | 5/1977 | Knusting et al. | 56/370 |
| 4,366,666 A | * | 1/1983 | van der Lely et al. | 56/370 |
| 4,723,402 A | | 2/1988 | Webster et al. | |
| 4,723,404 A | * | 2/1988 | Aron | 56/370 |
| 5,111,636 A | * | 5/1992 | Quirin | 56/367 |
| 5,493,853 A | * | 2/1996 | Tonutti | 56/377 |
| 5,862,659 A | * | 1/1999 | Aron | 56/367 |
| 5,953,894 A | * | 9/1999 | Aron et al. | 56/367 |
| 6,748,730 B2 | * | 6/2004 | Breneur et al. | 56/367 |
| 2005/0126154 A1 | | 6/2005 | Tonutti | |

(Continued)

FOREIGN PATENT DOCUMENTS

| | | |
|---|---|---|
| DE | 19736460 A1 | 2/1999 |
| DE | 20311102 U1 | 10/2003 |

(Continued)

*Primary Examiner* — Thomas B Will
*Assistant Examiner* — Mai Nguyen
(74) *Attorney, Agent, or Firm* — Hoyng Rokh Monegier LLP; Ramin Amirsehhi; David P. Owen

(57) ABSTRACT

A haymaking device for displacing mown crop includes a frame having a main beam which extends in a longitudinal direction and defines a longitudinal center line, and at least a first side arm located on one side of the main beam, wherein the side arm carries at least one crop processing tool, preferably rotatably driven about a rotor center line. The crop processing tool can be a crop displacing tool, such as a rake. The crop processing tool is mounted on a first pivot arm which, in the region of a first pivot arm connection, is pivotably connected, about a substantially horizontal center line, to the first side arm for movement between an operative position and a transport position. In the operative position, the first pivot arm connection is located at a larger distance from the main beam than the rotor center line of the first crop processing tool.

24 Claims, 14 Drawing Sheets

(56) References Cited

U.S. PATENT DOCUMENTS

| | | |
|---|---|---|
| 2005/0172603 A1* | 8/2005 | Breneur .................. 56/365 |
| 2006/0032631 A1 | 2/2006 | Rowse et al. |
| 2006/0059881 A1* | 3/2006 | Stutzmann .................. 56/379 |
| 2010/0032924 A1 | 2/2010 | Menichetti et al. |

FOREIGN PATENT DOCUMENTS

| | | |
|---|---|---|
| DE | 10 2004 035082 A1 | 2/2006 |
| DE | 10 2006 042552 A1 | 4/2007 |
| EP | 0548720 A2 | 6/1993 |
| EP | 1077595 B1 | 9/2003 |
| EP | 1095555 B1 | 9/2004 |
| EP | 1488685 B1 | 10/2006 |
| EP | 1716742 A1 | 11/2006 |
| EP | 1839480 B1 | 11/2008 |
| EP | 2022316 B1 | 2/2009 |
| EP | 2022317 B1 | 11/2010 |
| GB | 856098 A | 12/1960 |

* cited by examiner

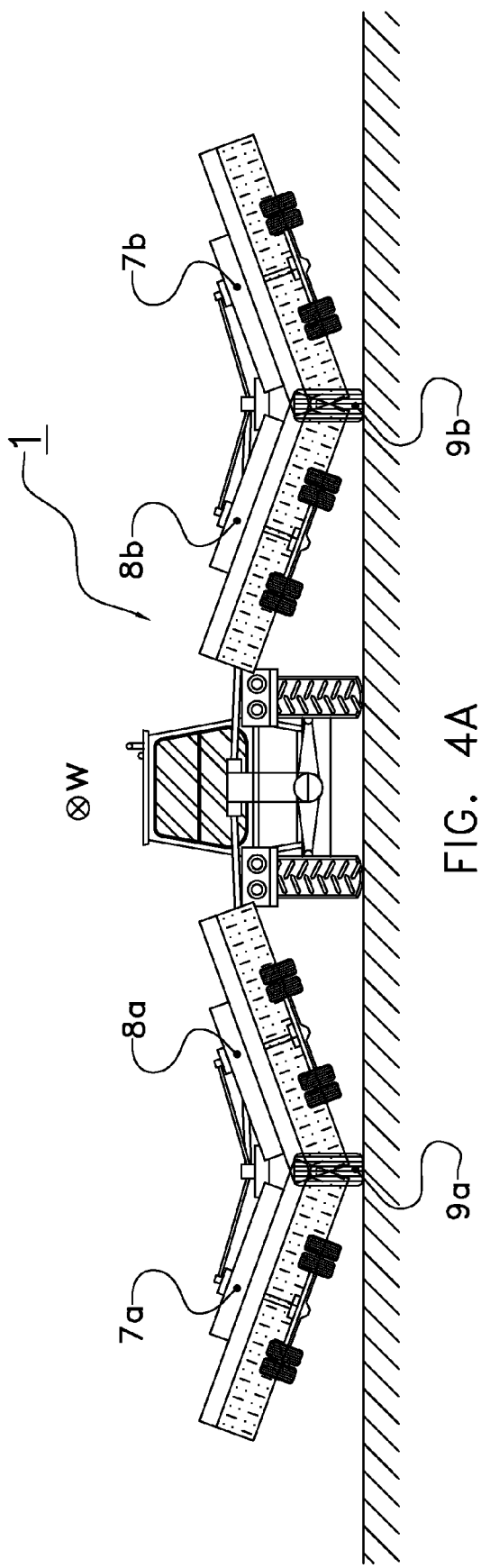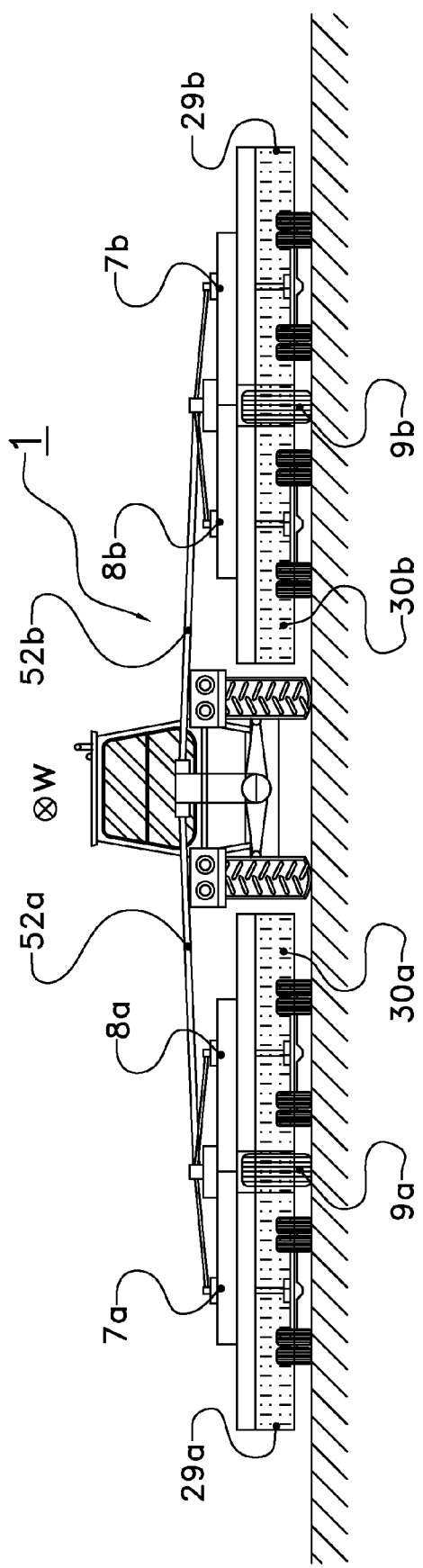

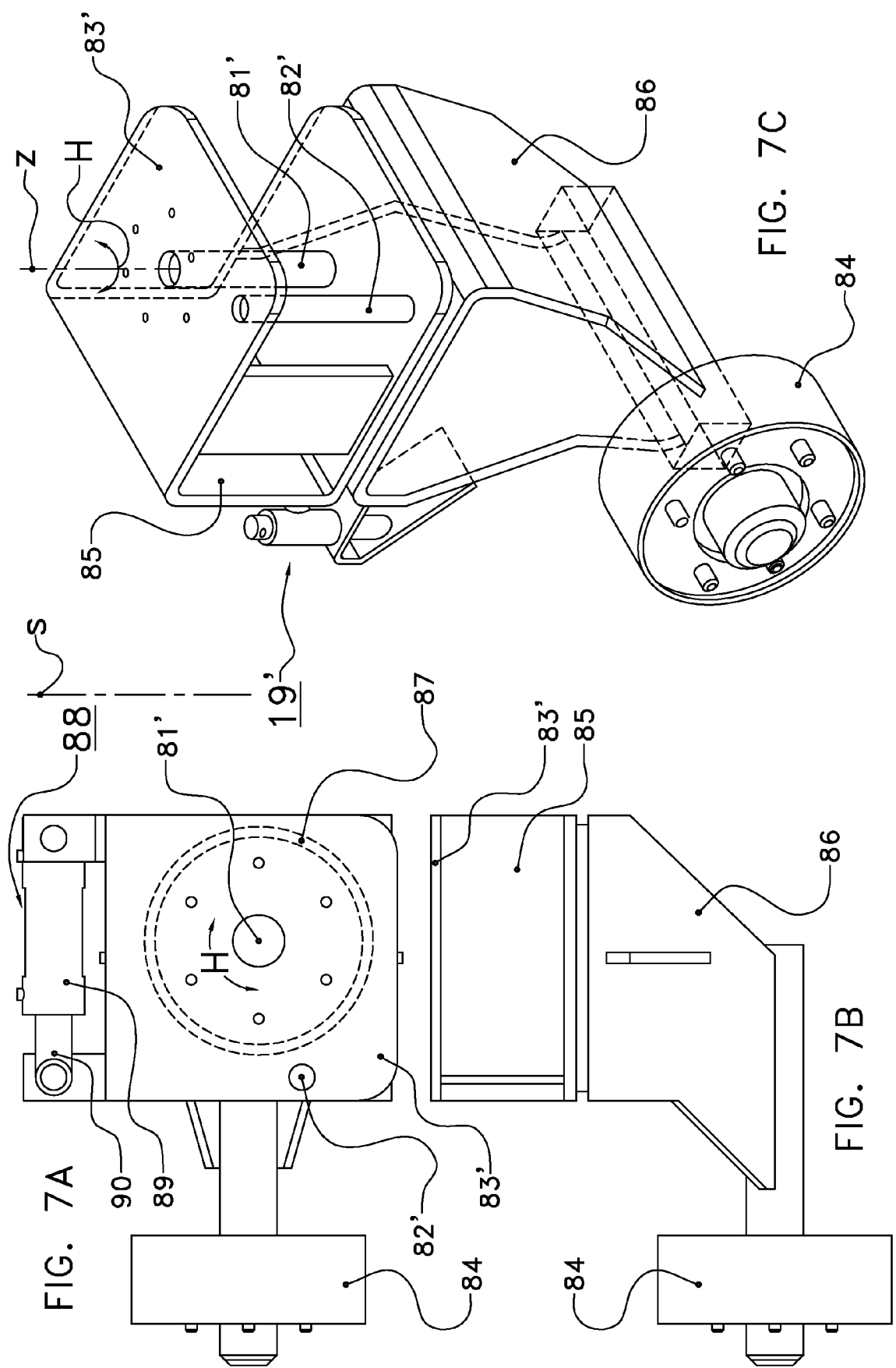

HAYMAKING DEVICE

CROSS REFERENCE TO RELATED APPLICATIONS

This application is a continuation of PCT application number PCT/NL2011/000015 filed on 4 Mar. 2011, which claims priority from Netherlands application number 1037784 filed on 8 Mar. 2010. Both applications are hereby incorporated by reference in their entireties.

BACKGROUND OF THE INVENTION

1. Field of the Invention

The invention relates to a haymaking device provided with at least one crop processing tool, such as a mower, a tedder or a rake. In particular, the invention relates to a device for displacing mown crop, in particular mown grass. The invention relates in particular to a crop displacing device provided with pins, in particular a rake device.

2. Description of the Related Art

Haymaking devices can be designed so as to have a central frame and side arms projecting on both sides thereof, on which side arms one or more crop processing tools are mounted.

In a commonly used rake device the side arms extend transversely to a main beam. Adjustment of the working width can take place by retracting/extending a part of the side arm that carries the circular rake, see for example EP 1.095.555. When bringing the rake device into the transport position, the outer part of the side arm is pivoted upwardly, whereafter the circular rake is substantially vertical and is narrow in horizontal transverse direction. In this case, the rake pins are usually oriented outwardly. In an alternative embodiment, see EP 2.022.316, the upwardly pivotable outer part is mounted on a bendable arm which can be bent outwardly/inwardly.

In another type of an embodiment of a rake device, the side arms diverge forwardly from a hinge mounting to a main beam, see EP 1.077.595, EP 1.488.685 and EP 2.022.317, which are all hereby incorporated by reference in their entireties. By pivoting the side arms in a horizontal plane, the working width can be set. By means of their own pivot arms, the circular rakes are connected to the side arms so as to be upwardly pivotable. In the upwardly pivoted transport position, in which both side arms are oriented parallel to the main beam, they extend transversely outwardly together with the rake pins.

As a result of the fact that the rake tines and the pivot parts extending between the rake wheels extend outwardly, the width of the rake device in transport position is fairly large. The width of the rake device in transport position, in particular in the rear part of the rake device, affects the maneuverability of the drawn rake device, in particular when making turns around buildings, in gates. In the case of a larger width, the risk of the rake pins coming into contact with stationary objects, such as a wall or column, increases. Said contact can result in that the rake pins or rake arms may become damaged and need to be replaced. Moreover, the rake pins projecting during transport constitute a danger to humans and animals.

The pivoting movement of circular rakes to a transport position in which rake pins are oriented inwardly is known per se.

For example, EP 0.548.720 discloses a double rake device mounted on the front end of a tractor, of which the two rake arms extending forwardly from a cross beam are upwardly pivotable and are also rotatable about their centre lines.

DE 10 2004 035 082, which is hereby incorporated by reference in its entirety, discloses a drawn, double rake device, the circular rakes being located on both sides of a main beam and can each be mounted on a rod extending in longitudinal direction, which rod is at one end rotatably mounted itself to a transverse arm which is connected to the main beam so as to be pivotable upwardly. In a not further described manner, when the transverse arm is pivoted upwardly, the circular rake can be rotated about the centre line of the longitudinal rod in such a manner that the rake pins extend inwardly in the transport position.

EP 1.839.480 which is hereby incorporated by reference in its entirety, discloses a rake device provided with six circular rakes, having two main arms each carrying three circular rakes. Each circular rake is connected to the respective main arm by means of an upwardly pivotable and rearwardly extending rake arm. The main arms are pivotably connected in the horizontal plane to a short transverse frame which is mounted to a tractor. In the transport position, the main arms extend rearwardly from the short transverse frame and the pivot arms are pivoted upwardly, in which case the rake pins of all circular rakes are oriented inwardly.

BRIEF SUMMARY OF THE INVENTION

It is an object of the invention to provide a haymaking device for displacing mown crop, which is provided with a main beam and a side arm comprising a pivot arm which carries a crop processing tool, by means of which the crop processing parts of the crop processing tool extend inwardly in the transport position.

It is an object of the invention to provide a haymaking device for displacing mown crop, provided with at least one crop processing tool, by means of which it is achieved in an alternative manner that the crop processing parts of the crop processing tool extend inwardly in the transport position.

It is an object of the invention to provide a haymaking device for displacing mown crop, which is provided with a main beam and a side arm comprising a pivot arm which carries a crop processing tool, by means of which the crop processing tool can be given a favourable position when manoeuvring on headlands.

It is an object of the invention to provide a compact haymaking device for displacing mown crop.

It is an object of the invention to provide a haymaking device for displacing mown crop, which has a good manoeuvrability.

It is an object of the invention to provide a haymaking device for displacing mown crop, whose width is adjustable in a favourable manner.

In order to achieve at least one of these objects, the invention provides, from one aspect, a haymaking device, in particular for displacing mown crop, comprising a frame having a main beam which extends in a longitudinal direction and defines a longitudinal centre line, and at least a first side arm located on one side of the main beam, wherein the side arm carries at least one crop processing tool, preferably rotatably driven about a rotor centre line, in particular a crop displacing tool, such as a rake, wherein at least a first crop processing tool is mounted on a first pivot arm, which pivot arm, in the region of a first pivot arm connection, is pivotably connected, about a substantially horizontal centre line, to the first side arm for movement between an operative position and a transport position, wherein, in the operative position, the first pivot arm connection is located at a larger horizontal distance from the longitudinal centre line than the rotor centre line of the first crop processing tool.

As an alternative, the invention provides, from another aspect, a haymaking device, in particular for displacing mown crop, comprising a frame having a main beam which extends in a longitudinal direction and defines a longitudinal centre line, and at least a first side arm located on one side of the main beam, wherein the side arm carries at least one crop processing tool, preferably rotatably driven about a rotor centre line, in particular a crop displacing tool, such as a rake, wherein at least a first crop processing tool is mounted on a first pivot arm, which pivot arm, in the region of a first pivot arm connection, is pivotably connected, about a substantially horizontal centre line, to the first side arm for movement between an operative position and a transport position, wherein, in the operative position, the first crop processing tool is substantially located between the first pivot arm connection and the longitudinal centre line.

When the crop processing tool is moved from an operative position to a raised position, in particular having an orientation corresponding to that of the transport position, it will pivot upwardly and outwardly, the crop processing parts, such as rake pins, then automatically assuming an inward directional component. When pivoting upwardly to some extent, the tool parts which are located more inwardly in the operative position, will be located at a higher level than tool parts which are located more outwardly. This is especially advantageous for rake devices in the case that a central windrow has to be made in the longitudinal direction, for example when turning on a headland.

The first pivot arm preferably extends substantially transversely to the longitudinal centre line, i.e. at an angle of more than 45 degrees. In a simple embodiment, the first pivot arm extends substantially at right angles to the longitudinal centre line.

In a further development of the device according to the invention, the first pivot arm is mounted on a first satellite frame which, in the region of a first rotational connection, is rotatably connected about a substantially vertical centre line to the first side arm. The satellite frame forms a support for at least the first pivot arm, which support is movable together with the side arm with respect to the main frame. The first satellite frame can have its own orientation with respect to the side arm. The first satellite frame can then be located at a height different from that of the side arm, preferably thereabove, in order to impede the mutual rotation as little as possible. In one embodiment, the device is provided with an aligning rod for the first satellite frame, which aligning rod is connected to the main beam to align the first satellite frame with respect to the side arm.

The first satellite frame can perform a function in providing, at a horizontal distance from the main beam, a movable support for further tools. In particular, a second crop processing tool can be mounted on a second pivot arm which, in the region of a second pivot arm connection, is pivotably connected about a substantially horizontal centre line to the first satellite frame for movement between an operative position and a transport position, wherein, in the operative position, the second pivot arm connection is located at a smaller horizontal distance from the longitudinal centre line than the rotor centre line of the second crop processing tool. Two pivot arms provided with a crop processing tool thus extend from the first satellite frame. The second pivot arms can be relatively short in relation to their horizontal distance from the longitudinal centre line. They can be oriented in opposite directions. In particular, they can be substantially identical, as a result of which the device can have an increased degree of modularity.

In particular for rake devices, with which raking takes place in a direction towards the main beam or the tractor, it is advantageous if the second pivot arm is located in front of the first pivot arm in the direction of travel.

If the first pivot arm connection is located at a larger horizontal distance from the main beam than the second pivot arm connection, the tools can at least partially coincide in the transport position, when viewed in a vertical plane of projection transverse to the longitudinal centre line, which can be advantageous to the transverse profile of the device in the transport position.

In one embodiment, the first pivot arm connection is mounted on a first satellite arm which is oriented rearwardly from the first rotational connection. In one embodiment, the second pivot arm connection is mounted on a second satellite arm which is oriented forwardly from the first rotational connection. The combination thereof is advantageous for reasons of compactness and stability.

The first satellite arm can be located at a larger horizontal distance from the longitudinal centre line than the second satellite arm, which can be advantageous to the width in the transport position, because of overlap in said vertical plane of projection, and can leave space for other objects in the rear part of the device in the transport position.

In a compact embodiment, the first satellite frame is mounted at the end of the first side arm.

The first satellite frame can perform a function in supporting the device, in which case the first satellite frame is provided with a support wheel which is located beside the crop processing tool and which is in particular also located at the end of the side arm. In this case, the position of the support wheel can be selected in such a manner that the support wheel is located between the first and second crop processing tools, in the shadow of the second crop processing tool, when viewed in the direction of travel, and need not drive over not yet processed crop. The support wheels follow the side arm when the position thereof is set, so that the stability is enhanced.

The controllability is enhanced if the support wheel is mounted to the first satellite frame so as to be rotatable about a substantially vertical centre line, which centre line preferably coincides with the centre line of the first rotational connection between the side arm and the first satellite frame. This can also be advantageous to the movement of the first side arm between an operative position and the transport position in the still to be described embodiment in which the first side arm is pivotable with respect to the main beam. In one embodiment comprising said support wheel, the device is further provided with means for setting the angle of rotation of the support wheel with respect to the first satellite frame. This makes it possible to control the first side arm when working on a transverse slope.

In a simple embodiment, the device has, in its transport position, as sole support points a hitch for a tractor and the support wheel of the first satellite frame.

In one embodiment, the haymaking device is designed as the type in which the side arm is movable between a transport position, in which it extends substantially along the main beam, at a first angle to the main beam, and an operative position, in which the first side arm extends sidewardly from the main beam, at a second angle, larger than the first angle. The aforementioned aligning rod can then form a parallelogram mechanism with the side arm and the satellite frame or a component which is rigidly connected thereto, so that the orientation of the first satellite frame with respect to the main beam is maintained in the case of the aforementioned movement of the first side arm.

From a further aspect, the invention provides a haymaking device comprising a frame having a main beam which extends in a longitudinal direction and defines a longitudinal centre line, and at least a first side arm located on one side of the main beam, wherein the first side arm carries at least a first crop processing tool, preferably driven in a rotating manner about a rotor centre line, such as a rake, wherein the first side arm is movable between a transport position, in which it extends substantially along the main beam, at a first angle to the main beam, and an operative position, in which the first side arm extends sidewardly from the main beam, at a second angle, larger than the first angle, wherein at least a first crop processing tool is mounted on a first pivot arm which, in the region of a first pivot arm connection, is pivotably connected, about a substantially horizontal centre line, to the first side arm for movement between an operative position, in which the crop processing tool can be active, and a transport position, wherein the first pivot arm is mounted on a first satellite frame which, in the region of a rotational connection, is rotatably connected about a substantially vertical centre line to the side arm, wherein the first satellite frame is mounted at the end of the first side arm and is provided with a support wheel. A few advantages of a haymaking device having such a first satellite frame have already been described in the foregoing.

In the operative position, the first pivot arm connection is located at a larger horizontal distance from the rotor centre line than the rotor centre line of the first crop processing tool, which enables to achieve the aforementioned advantages. Also in this case, the first satellite frame can be utilized for a second crop processing tool, which is mounted on a second pivot arm which, in the region of a second pivot arm connection, is pivotably connected about a substantially horizontal centre line to the first satellite frame for movement between an operative position, in which the second crop processing tool can be active, and a transport position, wherein, in the operative position, the second pivot arm connection is located at a smaller horizontal distance from the longitudinal centre line than the rotor centre line of the second crop processing tool.

This haymaking device can be designed in accordance with the earlier described haymaking device according to the invention, with one or more of the particularities mentioned for that device. For example, the satellite frame or a component rigidly connected thereto can form a parallelogram mechanism with an aligning rod and the side arm to maintain the orientation of the satellite frame with respect to the main beam.

In general, the haymaking device according to the invention can be designed as a double one, in which case the device is provided with a second side arm, located at that side of the main beam that is opposite to the first side arm, wherein the second side arm forms an arrangement which substantially corresponds to that of the first side arm with equipment provided thereon, mirrorwise with respect to the longitudinal centre line.

In an embodiment in which both side arms are movable between a transport position, in which they extend substantially along the main beam, at a first angle to the main beam, and an operative position, in which both side arms extend sidewardly from the main beam at a second angle, larger than the first angle, the haymaking device is provided with an operable mechanism for moving both side arms simultaneously between the transport position and the operative position and vice versa.

Both satellite frames can be provided with a support wheel located beside the crop processing tool. As already described above, the support wheel can be mounted to the satellite frame so as to be rotatable about a substantially vertical centre line, which centre line preferably coincides with the centre line of the first rotational connection between the side arm and the satellite frame. As a result thereof, moving the side arms simultaneously outwardly and inwardly with respect to the main beam is facilitated.

In this embodiment, the device is preferably further provided with means for setting the angle of rotation of each support wheel with respect to the satellite frame supported thereby, preferably for setting the angles of rotation of the support wheels independently of each other with respect to the satellite frame in question. Both side arms can then be adjusted in dependence on the profile of the transverse slope on that side of the device.

In a simple embodiment, a hitch for a tractor and the support wheels of both satellite frames form the sole support points for the device in the transport position.

From a further aspect, the invention provides a haymaking device, in particular for displacing mown crop, comprising a primary frame part with a hitch for hitching to a tractor, wherein the frame with the hitch defines a longitudinal centre line of the device, which is parallel to the direction of travel or movement in the operative position, wherein the device further comprises two secondary frame parts, located on both sides of the primary frame part, which are connected to the primary frame part and are each provided with at least two crop processing tools, preferably rotatably driven about a rotor centre line, in particular crop displacing tools, such as a rake, wherein a first crop processing tool is mounted on a first pivot arm which, in the region of a first pivot arm connection, is pivotably connected about a substantially horizontal centre line to the secondary frame part for movement between an operative position and a transport position, wherein, in the operative position, the first crop processing tool is substantially located between the first pivot arm connection and the longitudinal centre line, and wherein a second crop processing tool is mounted on a second pivot arm which, in the region of a second pivot arm connection, is pivotably connected about a substantially horizontal centre line, to the secondary frame part for movement between an operative position and a transport position, wherein, in the operative position, the second pivot arm connection is located at a smaller horizontal distance from the longitudinal centre line than the rotor centre line of the second crop processing tool.

From a further aspect, the invention provides a haymaking device, in particular for displacing mown crop, comprising a primary frame part with a hitch for hitching to a tractor, wherein the frame with the hitch defines a longitudinal centre line of the device, which longitudinal centre line is parallel to the direction of travel or movement in the operative position, wherein the device further comprises two secondary frame parts, located on both sides of the primary frame part, which are connected to the primary frame part and are each provided with a first and a second crop processing tool, preferably rotatably driven about a rotor centre line, in particular a crop displacing tool, such as a rake, wherein the first and second crop displacing tools are connected to the secondary frame by a first and a second pivot arm, respectively, for movement between an operative position and a transport position by a pivoting movement about a substantially horizontal pivot centre line, wherein, in the operative position, the first and second pivot arms extend in substantially opposite directions from the secondary frame part.

The haymaking devices described in the preceding two paragraphs can be designed so as to have one or a plurality of the above-mentioned features according to the invention, in particular as described in the subclaims. The primary frame part can in particular comprise a main beam, as described in the foregoing.

From a further aspect, the invention provides a haymaking device comprising a frame having a primary frame part and a front end provided with means for hitching to a tractor, and comprising four crop processing tools, in particular circular rakes, wherein the frame of the haymaking device comprises a longitudinal centre line which is substantially parallel to the direction of travel, wherein two crop processing tools are located on both sides of the longitudinal centre line, in operative position behind each other with the front one of each pair being outwardly staggered with respect to the rear one of said pair, wherein the rear crop processing tools are each mounted on a respective rear, first pivot arm which is mounted, by means of a first pivot connection, on or near the free end of a first frame arm which extends per se freely rearwardly in a floating manner, in particular substantially parallel to the longitudinal centre line and which, during use, is located at an intermediate distance from the longitudinal centre line, when viewed in a direction transverse thereto.

The front crop processing tools can each be mounted on a respective front, second pivot arm which is mounted, by means of a second pivot connection, on or near the free end of a second frame arm which extends per se freely forwardly in a floating manner, in particular substantially parallel to the longitudinal centre line and which, during use, is located at an intermediate distance from the longitudinal centre line, when viewed in a direction transverse thereto.

The first and/or second pivot centre lines can be substantially parallel to the longitudinal centre line.

The first pivot centre lines can be located at a horizontal distance from the longitudinal centre line, which horizontal distance is larger than that for the rear crop processing tools and/or wherein the second pivot centre lines are located at a horizontal distance from the longitudinal centre line, which horizontal distance is smaller than that for the front crop processing tools.

The first and, if present, the second frame arms preferably form part of a secondary frame part which is provided with a support wheel for the same and for the device. The secondary frame part is in particular in accordance with the aforementioned first or second satellite frame, is in particular mounted on the end of the aforementioned side arms of the frame of the device.

Also in this haymaking device, the secondary frame part—or satellite frame—can be movable to and from the longitudinal centre line by means of a parallelogram mechanism active in a horizontal plane.

The first frame arm can be located at a horizontal distance from the longitudinal centre line, which horizontal distance is larger than that for the second frame arm.

The primary frame part and the secondary frame parts can be interconnected by means of side arms whose ends are rotatably connected about substantially vertical centre lines to the primary frame part and the secondary frame parts, respectively.

From a further aspect, the invention provides a haymaking device, in particular for displacing mown crop, comprising a primary frame part with a hitch for hitching to a tractor, wherein the frame with the hitch defines a longitudinal centre line of the device, which longitudinal centre line is parallel to the direction of travel or movement in the operative position, wherein the device further comprises two secondary frame parts located on both sides of the primary frame part, connected to the primary frame part and each provided with at least a first crop processing tool, in particular a crop displacing tool, such as a rake, wherein the secondary frame parts are connected to the primary frame part by means of a parallelogram mechanism active in a horizontal plane, for movement between an operative position at a horizontal distance from the primary frame part and a transport position near the primary frame part whilst maintaining their orientation with respect to the longitudinal centre line.

The first crop processing tools can each be mounted on a first pivot arm which is mounted on the secondary frame part by means of a first pivot connection, wherein the first pivot centre lines are located at a horizontal distance from the longitudinal centre line, which horizontal distance is smaller than that for the first crop processing tools.

Each secondary frame part can further be provided with second crop processing tools, which are each mounted on a second pivot arm which is mounted on the secondary frame part, behind the first pivot arm, by means of a second pivot connection, wherein the second pivot centre lines are located at a horizontal distance from the longitudinal centre line, which horizontal distance is larger than that for the second crop processing tools.

The first and second pivot arms can extend on both sides of and from the respective secondary frame part, preferably in opposite directions.

In this case, the primary frame part and the secondary frame parts can be interconnected by means of side arms whose ends are rotatably connected about substantially vertical centre lines to the primary frame part and the secondary frame parts, respectively.

The haymaking device according to the invention is in particular a rake device, wherein the crop processing tool is a rake comprising a circular rake having a substantially vertical rotor centre line in operative position.

In an embodiment of the haymaking device according to the invention having favourable possibilities of adjusting the working width, the horizontal distance between the crop processing tool and the associated pivot arm connection is adjustable, in particular by a telescopic design of the associated pivot arm. This enables a precision adjustment with respect to the adjustment by means of the angle of the side arms.

From a further aspect, the invention provides a haymaking device comprising a frame having a central, primary frame part, such as a main beam extending in longitudinal direction, and a longitudinal centre line (S), and two side arms ($4a,4b$) extending sidewardly on both sides of and from the central frame part and each carrying at least one crop processing tool, driven in a rotating manner about a rotor centre line, such as a rake, in particular crop displacing tools, which crop processing tool is connected to the respective side arm by means of a pivot shaft having a substantially horizontal pivot centre line in order to be pivoted between an operative position and an upwardly pivoted transport position, wherein the device further comprises hitching means (3) for hitching the device to a tractor, and support wheels ($9a,9b$) for supporting the frame in the operative position and the transport position of the device, wherein the support wheels are mounted to the ends of the side arms and are each rotatable about a substantially vertical centre line, wherein means are provided for setting the position of each support wheel with respect to the longitudinal centre line in at least one oblique position with respect to the longitudinal centre line.

From a further aspect, the invention provides a haymaking device comprising a frame having a central, primary frame part, such as a main beam extending in longitudinal direction, and a longitudinal centre line (S), and two side arms ($4a,4b$) extending sidewardly on both sides of and from the central frame part and each carrying at least one crop processing tool, preferably driven in a rotating manner about a rotor centre line, such as a rake, in particular crop displacing tools, which crop processing tool is connected to the respective side arm by means of a pivot shaft having a substantially horizontal pivot centre line in order to be pivoted between an operative position and an upwardly pivoted transport position, wherein the device further comprises hitching means (3) for hitching the device to a tractor, and support wheels (9a,9b) for supporting the frame in the operative position and the transport position of the device, wherein the support wheels are mounted to the ends of the side arms and are each rotatable about a substantially vertical centre line, wherein means are provided for adjusting the support wheels for the side arms into different oblique positions with respect to the longitudinal centre line.

In an embodiment in which the side arms are pivotable about a substantially vertical pivot centre line between one or more extended operative positions, in which they extend sidewardly from the central, primary frame part, and an inwardly pivoted transport position, in which they extend substantially parallel to the longitudinal centre line, wherein the one or more setting means (e.g., setting mechanism) is configured to be operated simultaneously but in opposite sense, so that the support wheels diverge or converge at the same angle with respect to the longitudinal centre line, which is helpful in the case of extending the side arms or pivoting the side arms inwardly.

BRIEF DESCRIPTION OF THE DRAWINGS

The features and advantages of the invention will be appreciated upon reference to the following drawings, in which:

FIGS. 4A and 4B show a front view of the device of FIG. 1 during operation and a front view thereof during a manoeuvre on a headland, respectively;

FIGS. 7A-C show an oblique view, a front view and a top view of an alternative embodiment of a hub holder for a support wheel of the device according to FIG. 1.

DESCRIPTION OF ILLUSTRATIVE EMBODIMENTS

Figure 1:
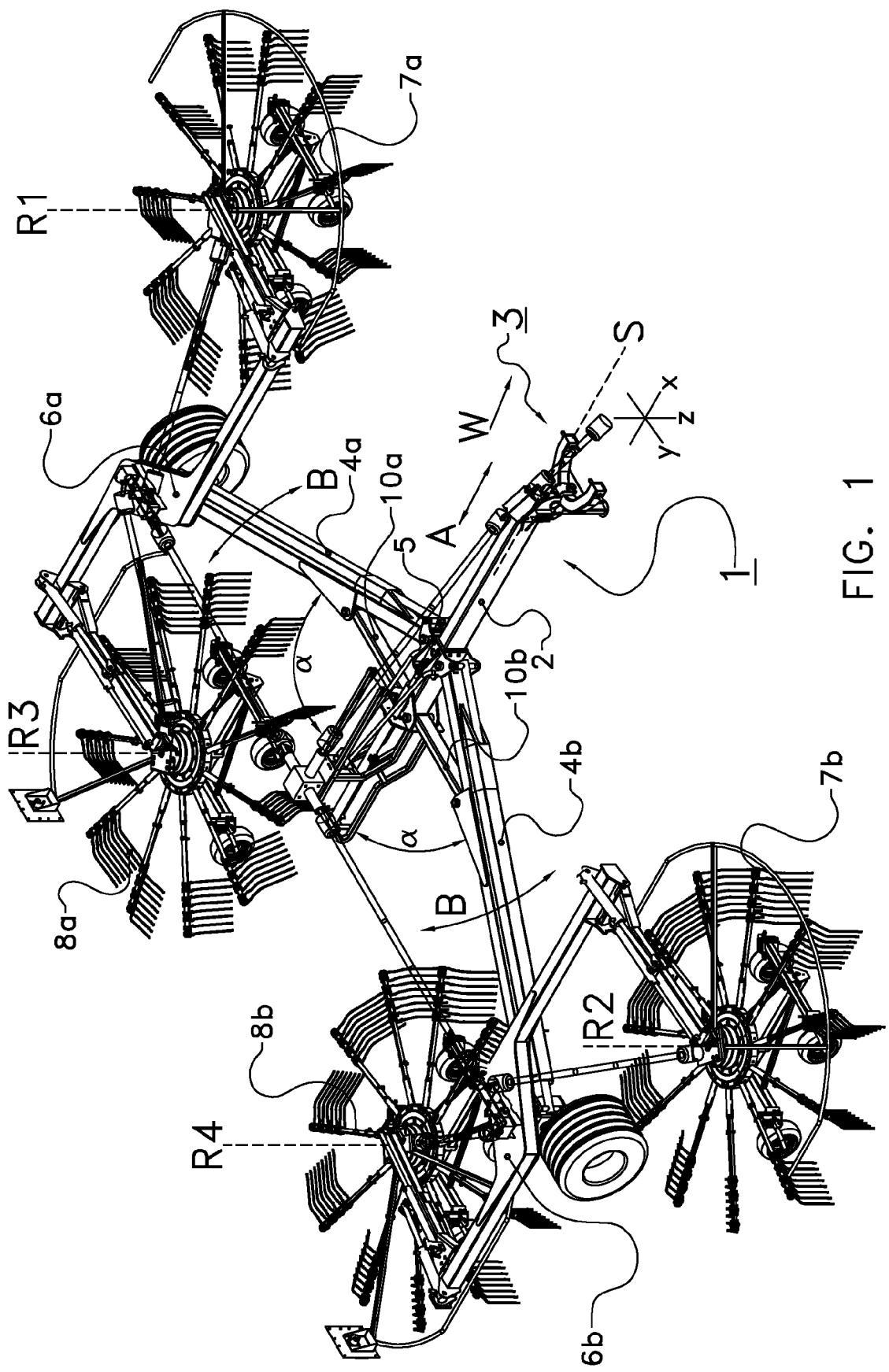
FIG. 1 shows an oblique front view of an embodiment of a haymaking device according to the invention, designed as a rake device.

The following is a description of certain embodiments of the invention, given by way of example only and with reference to the drawings. FIGS. 1 and 2A-C show a circular rake device 1 with direction of travel W, comprising a main beam 2 which defines a longitudinal centre line S of the device 1 and which, as a primary frame part, constitutes in this example part of a frame of the device—and a front end of which is provided with a hitch 3 for hitching to a non-shown tractor. The hitch 3 provides three degrees of rotation (X,Y,Z). On the main beam 2 there is provided a slide element 5 which is slidable over/along the main beam, parallel to the longitudinal centre line S, see arrows A.

Two side arms 4a,b, which also constitute part of the frame, extend on both sides of the main beam 2, from the slide element 5 at equal angles alpha (α) to the longitudinal centre line S. At the outer ends of the side arms 4a,b there are mounted subframes or secondary frame parts, hereinafter to be called satellite frames 6a,b. As will be explained hereinafter, the satellite frames 6a,b are rotatable there about substantially vertical hinge centre lines with respect to the side arms. The satellite frames 6a,b each carry two circular rakes 7a,8a and 7b,8b with substantially vertical rotational centre lines R1,3,2,4, respectively, and are supported by frame support wheels 9a,b which are located in the shadow of circular rakes 7a,b. The two satellite frames 6a,b make the device 1 resemble to some extent to a catamaran.

The side arms 4a,b are further connected to the main beam 2 (see also FIG. 2C) by means of holding rods 10a,b, the outer ends of said holding rods 10a,b being hingeably connected, in the region of hinges 12a,b, to brackets 11a,b which are mounted on the side arms 4a,b. The inner ends of the holding rods 10a,b are hingeably connected, in the region of hinges 13a,b, to a bracket 20a,b which is statically mounted on the main beam 2. The inner ends of the side arms 4a,b are hingeably mounted, in the region of hinges 14a,b, to the slide element 5 via pins 18a,b. The holding rods 10a,b and the part (here approximately ⅓) of the side arms 4a,b between the hinges 12a,b and 14a,b form, together with a part of the main beam 2 that is adjustable in length by means of the slide element 5, triangles which are transformable in shape.

Aligning rods 16a,b extend along the front side of the side arms 4a,b, partially shielded by hoods 17a,b, towards the hub holders 19a,b for the wheels 9a,b. The hub holders 19a,b are hingeably connected to both the outer ends of the side arms 4a,b (by hinge pin 81a,b, see FIG. 2D) and to the outer ends of the aligning rods 16a,b (by hinge pin 82a,b, see FIG. 2D), in such a manner that a parallelogram mechanism active in a horizontal plane is formed, in which the hub holder and the slide element form the short sides. The aligning rod 16a,b is slidably connected indirectly, by means of the slide element 5, to the main beam 2, as well as the side arm 4a,b.

Also owing to the fact that the satellite frames 6a,b form a rotationally fixed unit with the hub holders 19a,b (rigidly mounted on upper plate 83a,b—FIG. 2D—of hub holders 19a,b), they will maintain their orientation with respect to the longitudinal centre line S in the case of deformation of the parallelogram mechanisms. The satellite frames 6a,b are located above the upper surface of the side arms 4a,b so that the relative rotation of the side arms 4a,b with respect to the satellite frames 6a,b is not impeded.

Figure 5A:
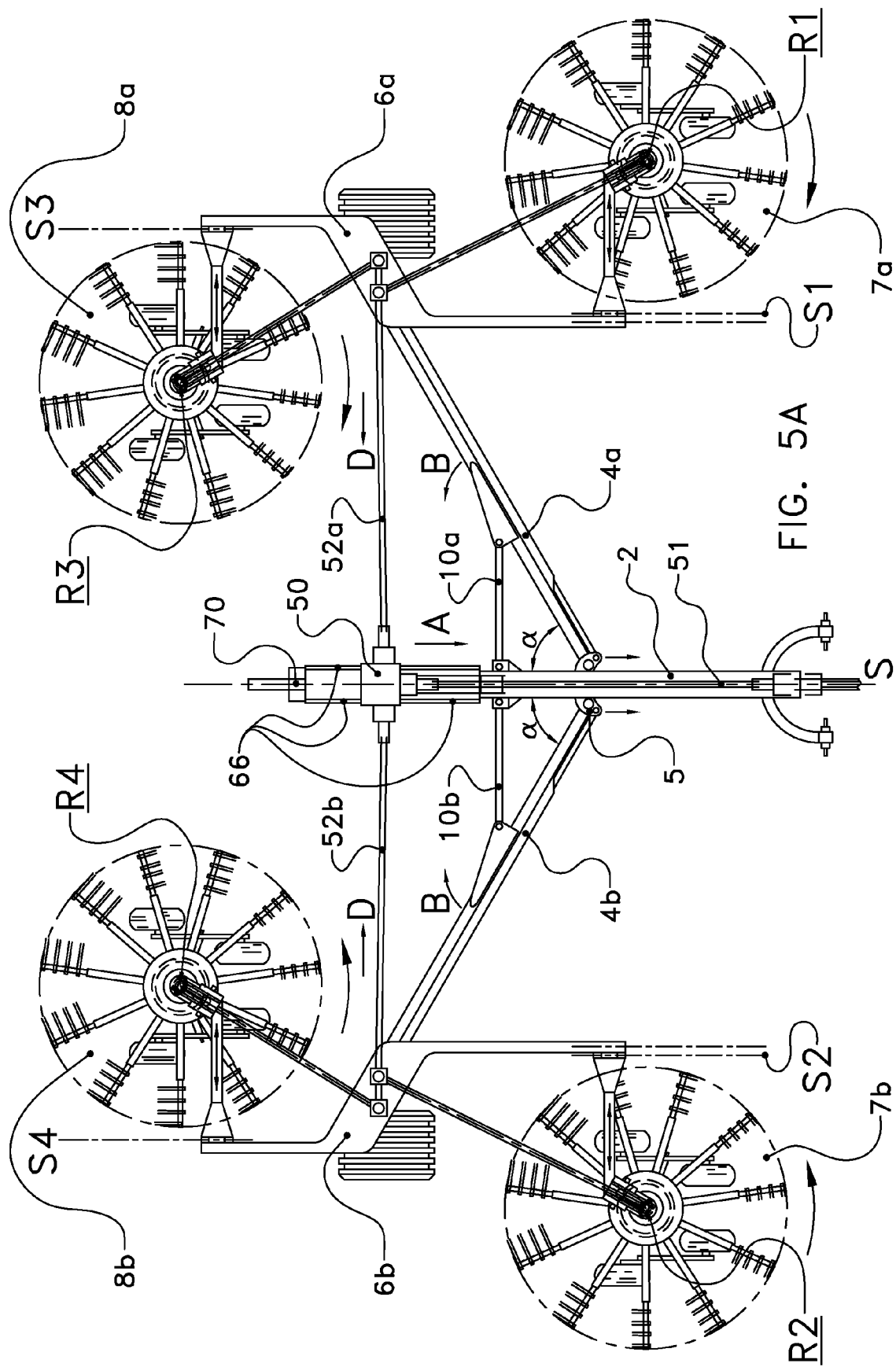
FIGS. 5A-5D show the operative position of FIG. 1, a narrower operative position and a transport position of the device of FIG. 1, a top view and an oblique top view of the device of FIG. 1, respectively, during the switching from an operative position to the transport position.

The satellite frames 6a,b, see also FIGS. 5A,B, each comprise a forwardly oriented satellite arm 21a,b and a rearwardly oriented satellite arm 22a,b, which carry the circular rakes 7a,b and 8a,b, respectively, when these are not supported by wheel sets 31a,b and 32a,b, known per se, which carry the circular rakes in the normal operative position. The satellite arms 21a,b and 22a,b extend parallel to the longitudinal centre line S and project in a floating manner forwardly and rearwardly, respectively, in the manner of a projecting beam.

Outwardly oriented pivot arms 23a,b are mounted to the front ends of the satellite arms 21a,b in a manner in which they are pivotable in a vertical plane about pivot centre lines C1,2 between an operative position and one or more raised positions, in particular an upwardly pivoted transport position. They each comprise a telescopic arm 33a,b with retractable/extendable arm parts 35a,b and cylinders 37a,b with piston rods 39a,b whose ends are mounted to the arm parts 35a,b. The arm parts 35a,b carry rotors 25a,b on which rake arms 27a,b with rake pins 29a,b are removably mounted in a manner known per se. In the operative position, the rotors 25a,b have substantially vertical rotor centre lines R1,2. For the pivoting movement of the pivot arms 23a,b, there are provided cylinders 41a,b, whose piston rods 43a,b engage the telescopic arms 33a,b.

Outwardly oriented pivot arms 24a,b are mounted to the rear ends of the arms 22a,b in a manner in which they are pivotable in a vertical plane about pivot centre lines C3,4 between an operative position and one or more raised positions, in particular an upwardly pivoted transport position. They each comprise a telescopic arm 34a,b with retractable/extendable arm parts 36a,b and cylinders 38a,b with piston rods 40a,b whose ends are mounted to the arm parts 36a,b. The arm parts 36a,b carry rotors 26a,b on which rake arms 28a,b with rake pins 30a,b are removably mounted in a manner known per se. In the operative position, the rotors 26a,b have substantially vertical rotor centre lines R3,4. For the pivoting movement of the pivot arms 24a,b, there are provided cylinders 42a,b, whose piston rods 44a,b engage the telescopic arms 34a,b.

The pivot arms 23a,b and 24a,b may be composed of identical components, so that a high degree of modularity is achieved.

The distance from the satellite arms 21a,b to the longitudinal centre line S is smaller than the distance from the satellite arms 22a,b to the longitudinal centre line S, and the same applies to the location of the pivot centre lines C1,2 with respect to the location of the pivot centre lines C3,4, see also FIG. 5A. The rotor centre lines R1,2 are located at a distance from the longitudinal centre line S, which distance is larger than that for the pivot centre lines C1,2 in the region of the pivot connection to the satellite arms 21a,b. On the contrary, the rotor centre lines R3,4 are located at a distance from the longitudinal centre line S, which distance is smaller than that for the pivot centre lines C3,4 in the region of the pivot connection to the satellite arms 22a,b. As a result thereof, the pivot arms 23a,b pivot inwardly upwards, and the pivot arms 24a,b pivot outwardly upwards.

During raking of a mowing field, the device 1 will usually touch mown grass with all circular rakes, such as indicated in FIG. 4A. After making a stroke over the terrain, the device 1 has to make a turn of 180 degrees to choose position for the return stroke. Said turning takes place in a strip of the terrain at the beginning or the end of the strokes to be made, where the mown grass is still lying on the mowing field, scattered or already in the form of windrows. Such a strip is also called headland. In order to prevent that the grass will be displaced unintentionally when manoeuvring on the headland, it will be desired to prevent the circular rakes 7a,b and 8a,b from coming into contact with the grass. By using the satellite frames 6a,b having pivot arms 23a,b and 24a,b extending on both sides thereof, comparable conditions are created for all circular rakes. Also the outer circular rakes 7a,b are raised by means of a short pivot arm, see FIG. 4B. Moreover, the circular rakes 8a,b will soon come free from a windrow located below the middle of the device, when said windrow is followed over a short or longer distance during manoeuvring on the headland or on a mowing field already raked into windrows. When the device crosses a windrow, comparable results are achieved.

For the drive of the rotors 25a,b and 26a,b, there is provided a central gearbox 50 which, in a vertical plane which contains the longitudinal centre line S, is movably supported by the main beam 2. The central gearbox 50 forms a double right-angled transmission having exits 58a,b which are in line with each other and have an opposite transverse orientation. The entrance 58c of the central gearbox 50 is operatively coupled, by means of a cardan coupling, to a main drive shaft 51 which is telescopic and whose front end can be operatively coupled, by means of a cardan coupling, an intermediate shaft 51a in a bearing mounted on the front end of the main beam 2 and a cardan coupling, to a power take-off of a tractor. The exits 58a,b are operatively coupled, by means of cardan couplings, to telescopic secondary drive shafts 52a,b whose outer ends are operatively coupled, by means of cardan couplings, to second corner gearboxes 53a,b. The secondary drive shafts 52a,b are continued, by short drive shafts 54c,d, to third corner gearboxes 55c,d. The second and third gearboxes 53a,b and 55a,b each comprise an exit which extends obliquely forwardly and outwardly, and obliquely rearwardly and inwardly, respectively. Telescopic rotor drive shafts 56a,b and 57a,b are operatively coupled, by means of cardan couplings, to said exits, for the drive of the rotors 25a,b and 26a,b of the circular rakes 7a,b and 8a,b.

Figure 2A:
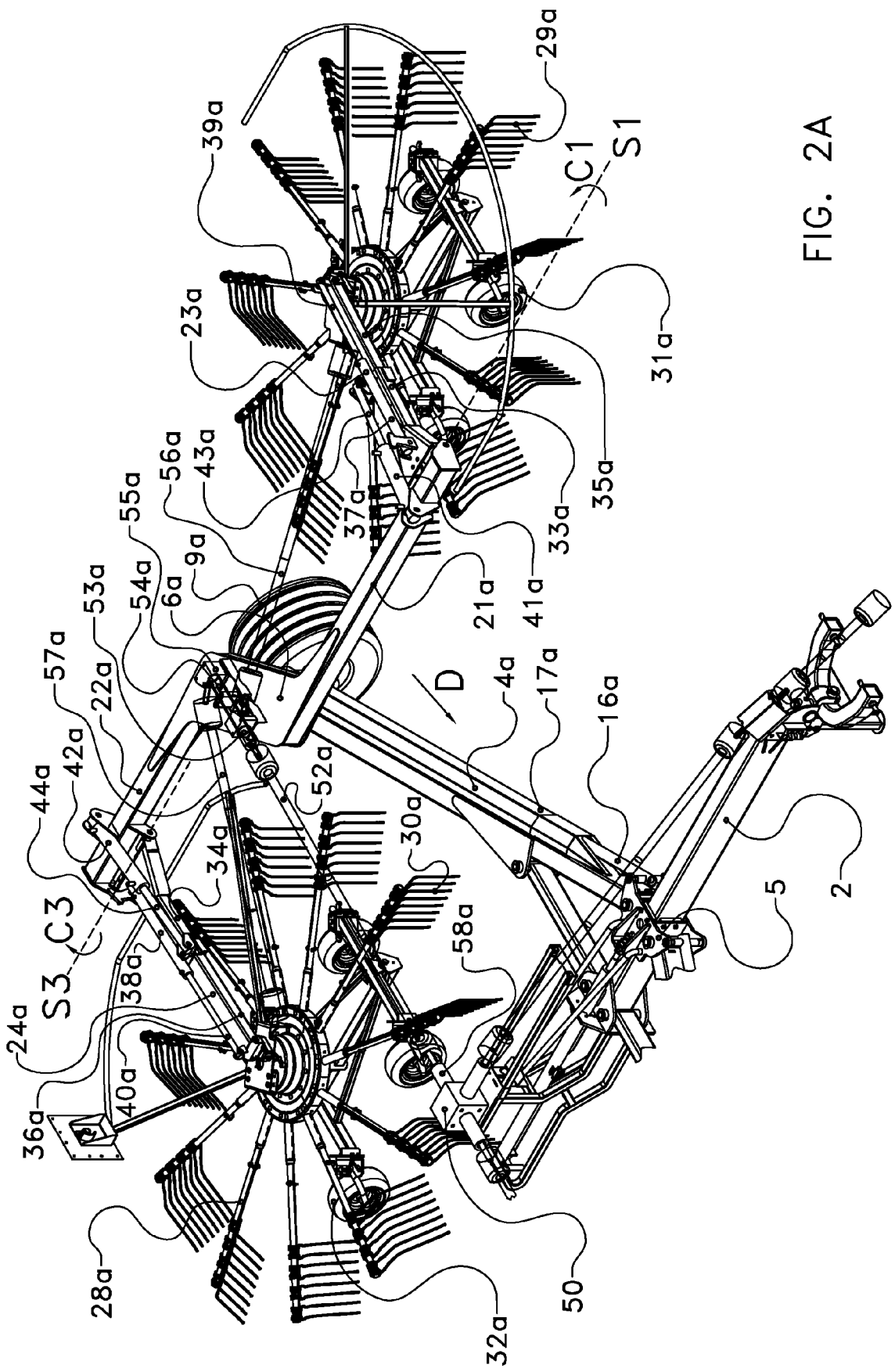
FIGS. 2A-D show an enlarged view of a left half, an enlarged view of a right half, an enlarged view of a central part and a detail of a part of the device of FIG. 1, respectively.
Figure 2B:
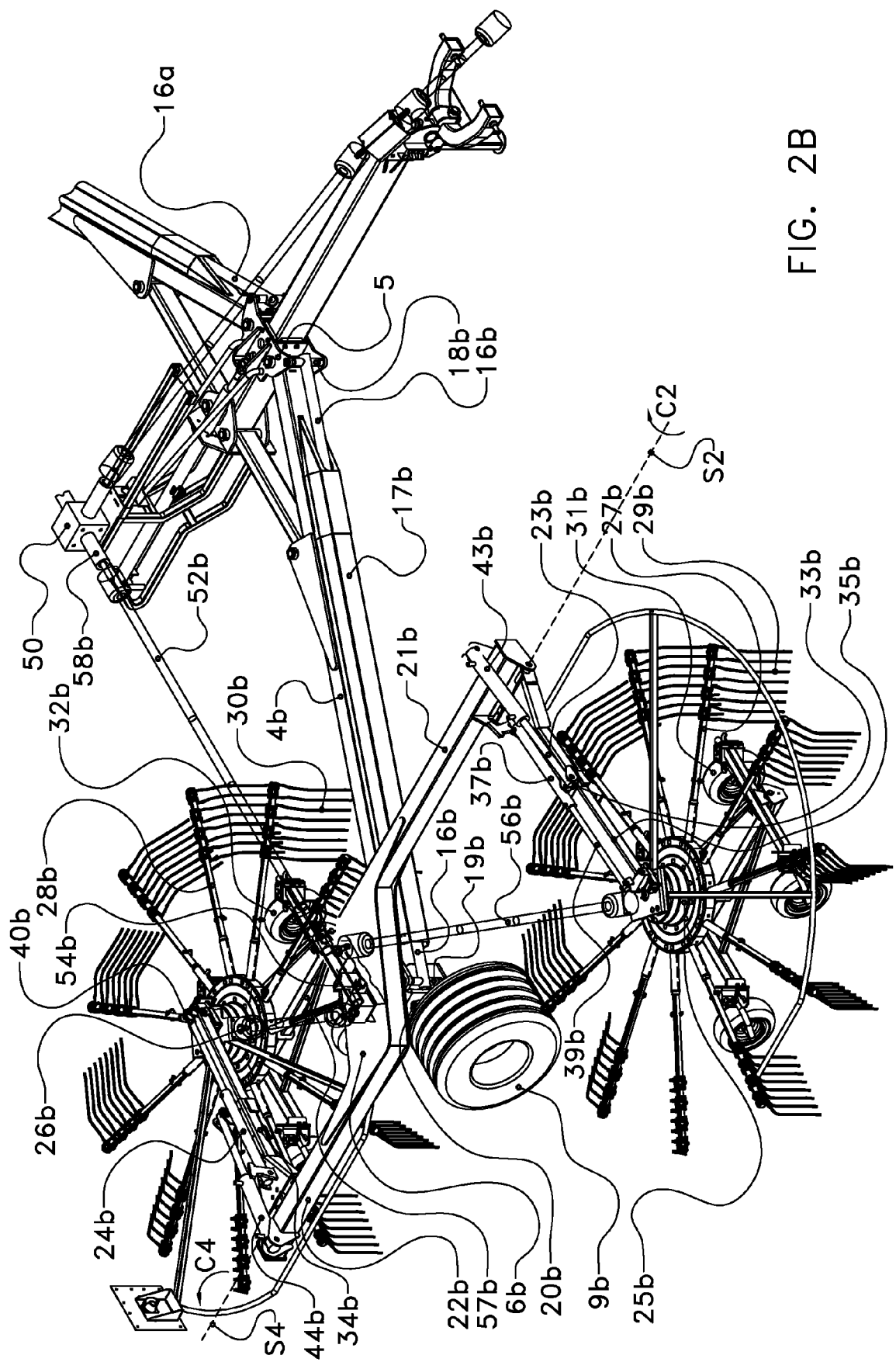
Figure 2C:
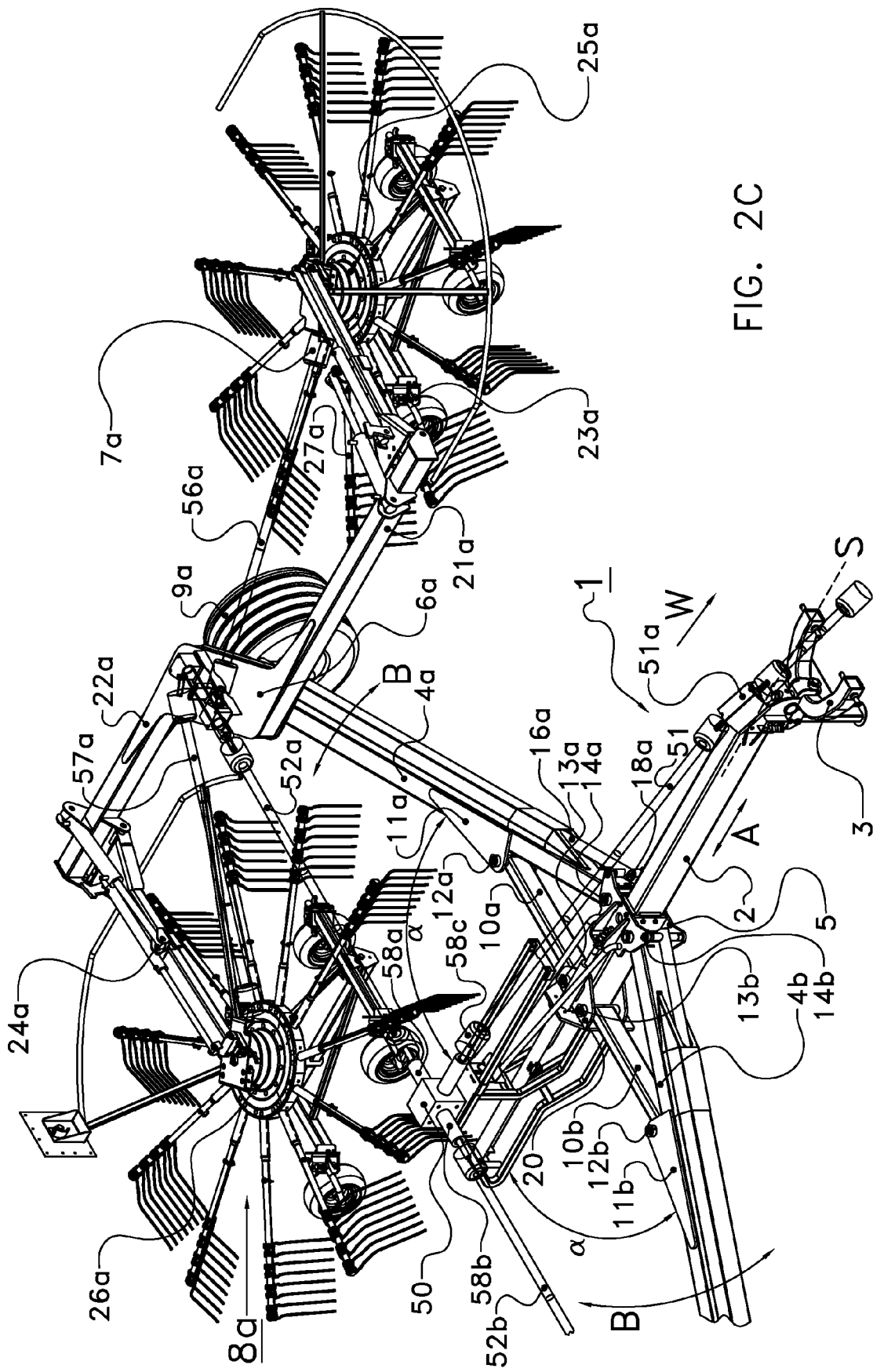
Figure 2D:
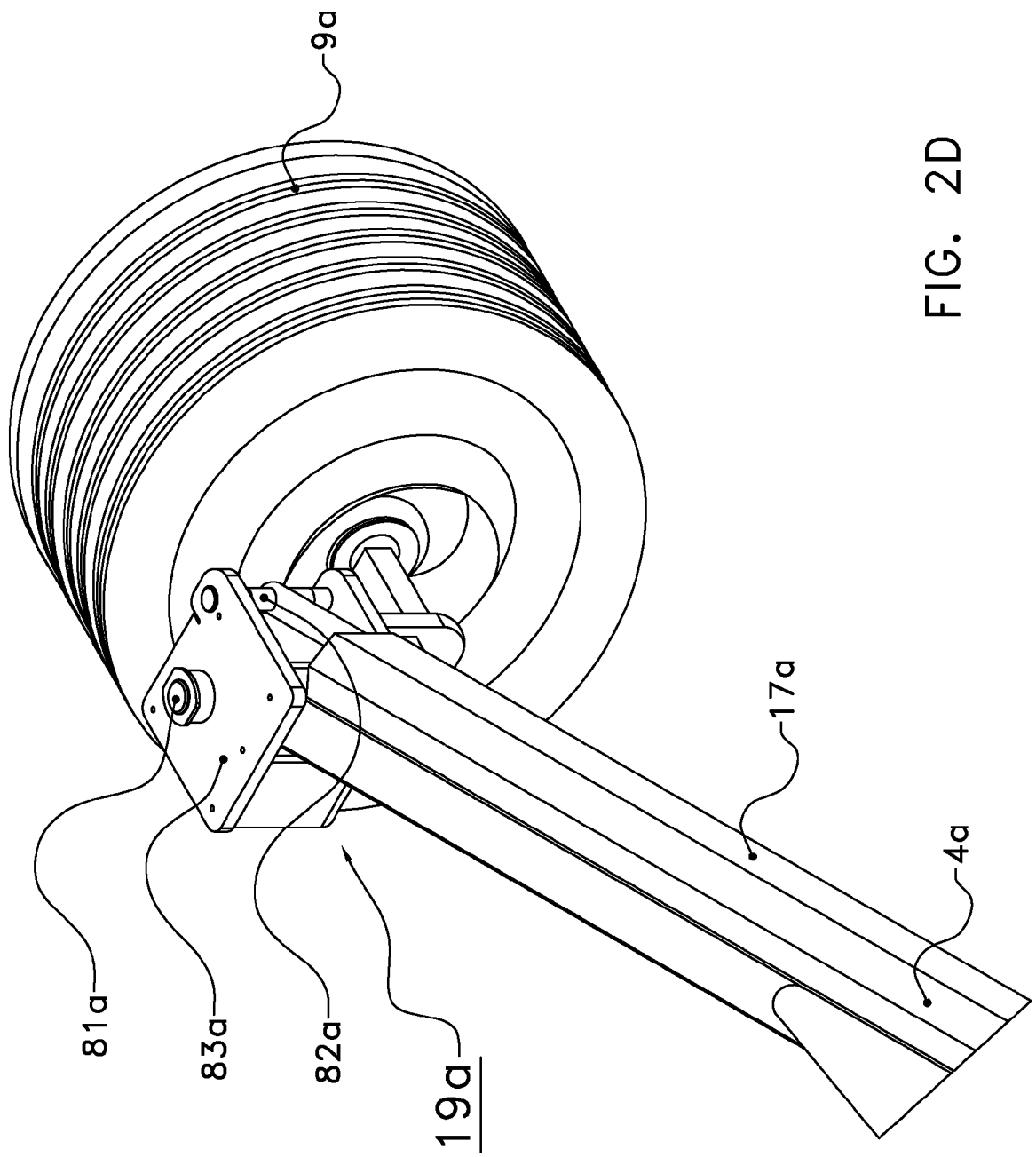
Figure 3A:
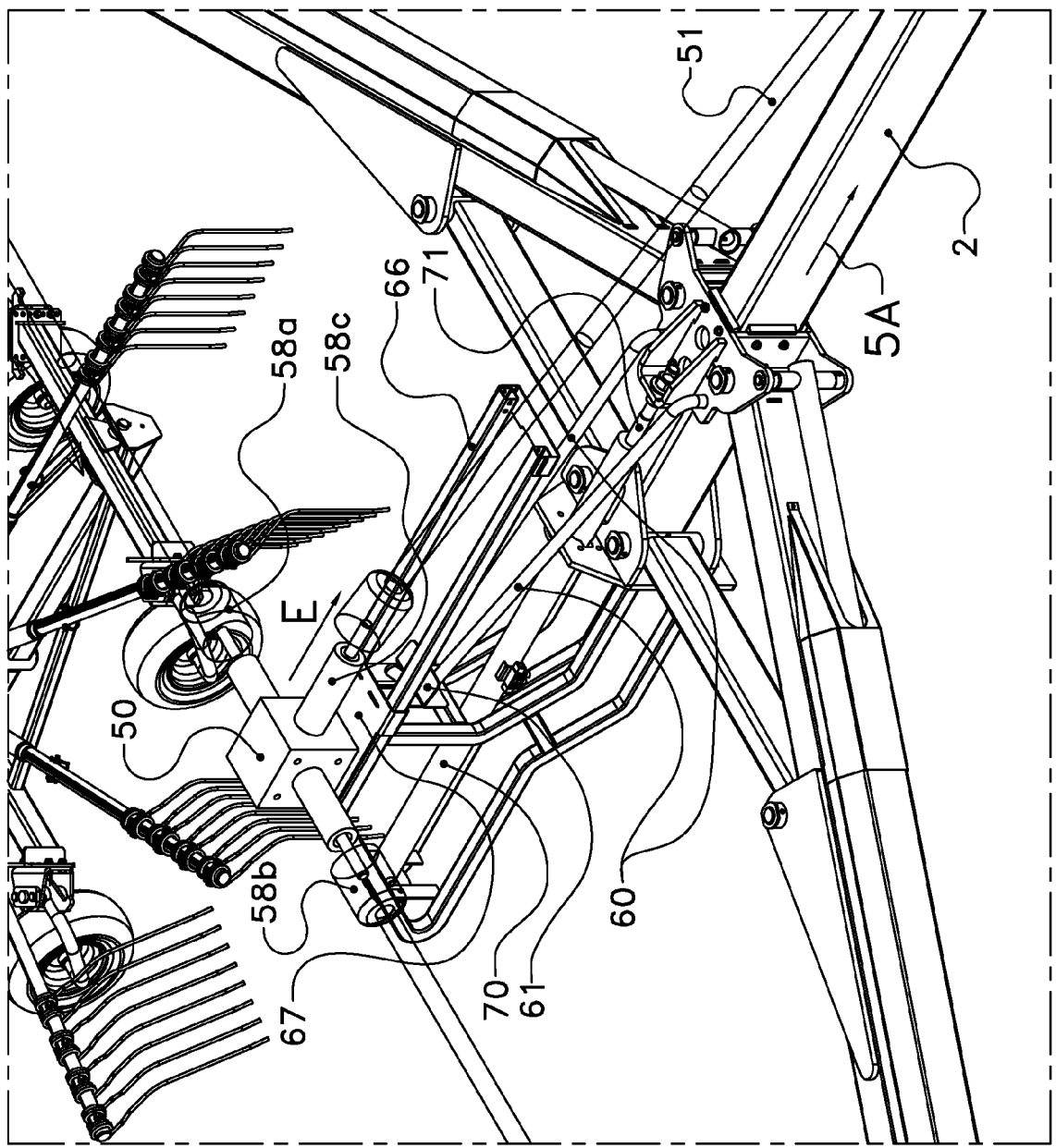
FIGS. 3A and 3B show details of the device of FIG. 1 in two stages of transition from an operative position to a transport position.
Figure 3B:
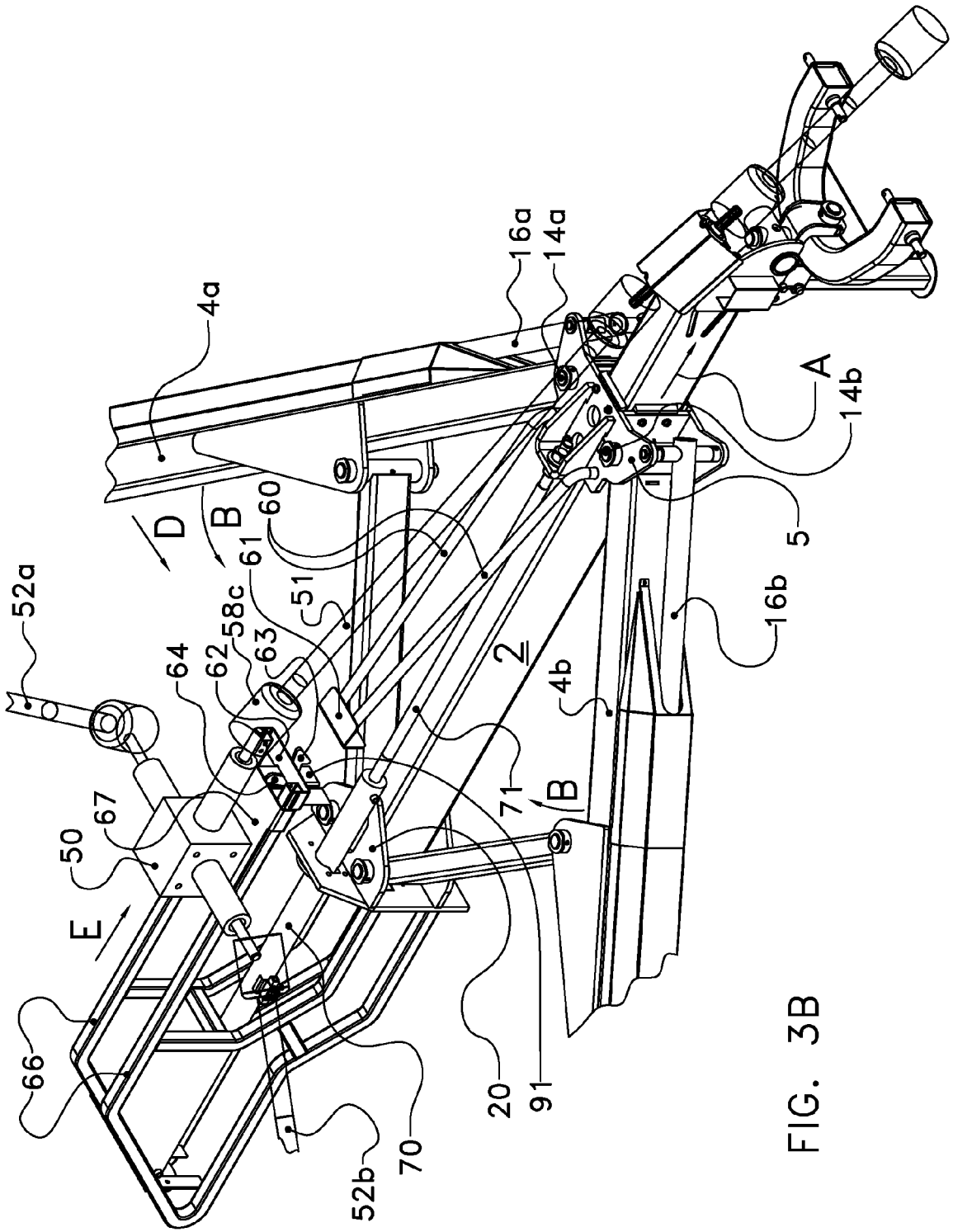

In the embodiment of FIGS. 1, 2A-, 3A and 3B, the central gearbox 50 is mounted on a slide 67 which is slidable in longitudinal direction (direction E) on rails 66 mounted on the main beam, the front ends of said rails being interconnected by a transverse rod 62 which forms a stop for the slide 67. The front side of the slide 67 is detachably connected, by means of a hook 63 (FIG. 3B), to a transverse section 61 mounted to the rear ends of two rigid pulling/pushing rods 60 whose front ends are mounted to the slide element 5 and have a substantially constant orientation. The hook 63 forms an integral whole with a catch 64 and is tiltable therewith in a vertical plane which contains the longitudinal centre line S. Below the hook 63, the slide 67 is provided with a forwardly oriented stop surface 91.

In order to move the slide element 5 along/over the main beam 2, a cylinder 70 is mounted, above the main beam 2, to said main beam, the piston rod 71 of said cylinder being mounted to the slide element 5.

The working width of the device 1 can be set by having the side arms 4a,b project sidewardly to a greater or lesser extent in the direction D, by changing the angle alpha ($\alpha$) between the side arms 4a,b and the main beam 2. The support wheels 9a,b follow that setting and maintain substantially their position with respect to the associated circular rakes. The working width can be set further (more precisely) by the cylinders 37a,b and 38a,b, by means of which also the relative mutual position of the circular rakes 7a,8a and 7b,8b and their rotor centre lines in transverse direction can be set.

When changing the working width of the device 1 and passing to the transport position (and the freight position to be described hereinafter), the aforementioned cardan couplings can assume the desired angular position.

In the position shown in FIGS. 1 and 5A, the angle alpha ($\alpha$) is maximal and the holding rods 10a,b are transverse to the main beam 2 and the side arms 4a,b are at a rearwardly opening angle alpha ($\alpha$) of approximately 65 degrees to the longitudinal centre line S.

If it is desired to reduce the working width (from FIG. 5A to FIG. 5B) or to bring the device into the transport position (FIG. 5D) (see also FIG. 5C), the cylinder 70 is activated, which results in that the slide element 5 is moved with respect to the bracket 20, along/over the main beam 2, in forward direction (direction A). In the meantime, the device 1 is moved forwardly. The base of the aforementioned triangles is then increased and the angles made by the holding rods 10a,b and the side arms 4a,b with said base are then reduced. When the desired working width has been achieved (see for example FIG. 5B), the operation of the cylinder 70, and consequently the movement of the slide element 5, is stopped. Due to the parallelogram mechanism of the aligning rods 16*a,b*, the hub holders 19*a,b*, the side arms 4*a,b* and the slide element 5, the support wheels 9*a,b* maintain their orientation in the direction of travel and also the satellite frames 6*a,b* maintain their orientation.

Figure 5B:
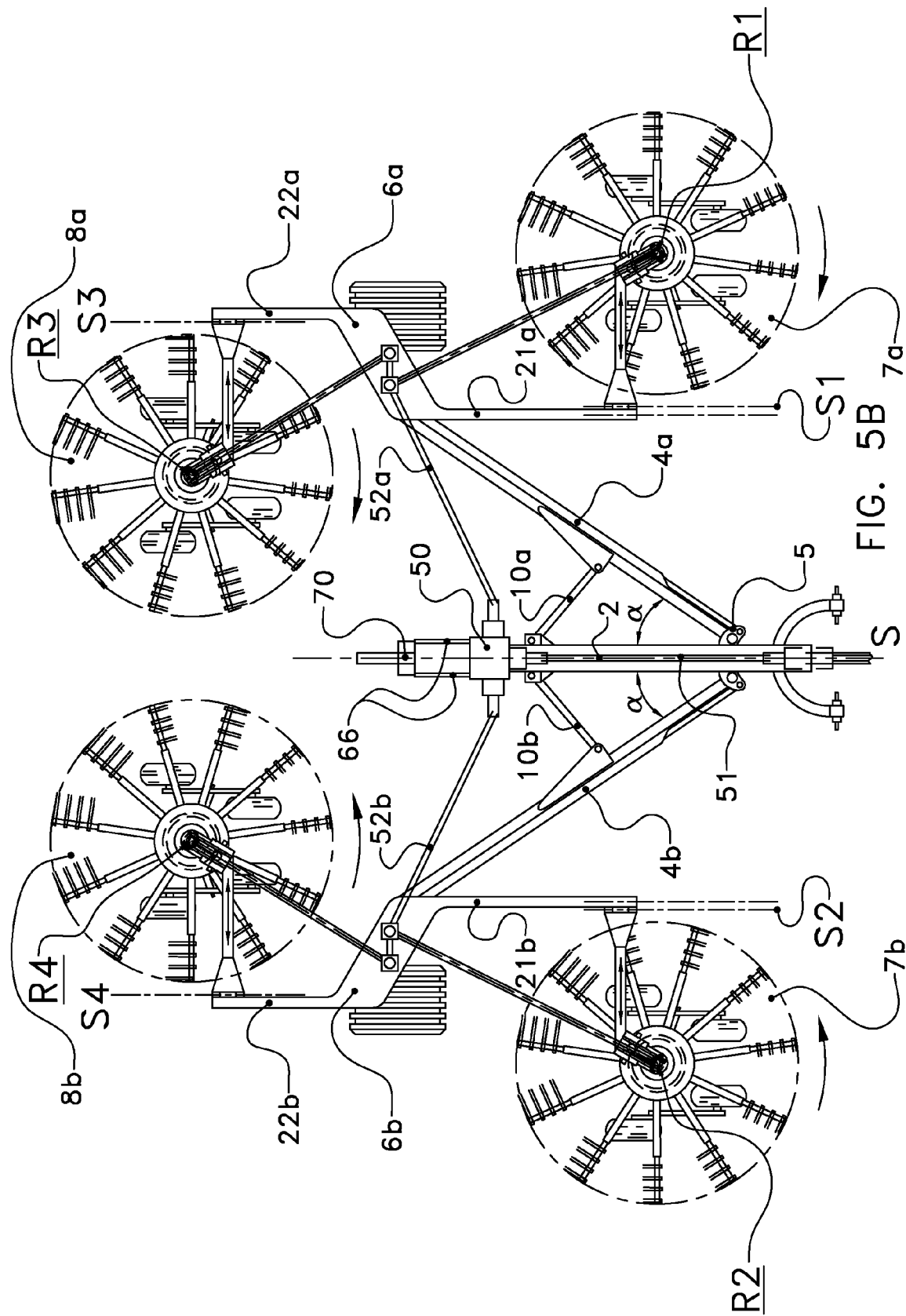
Figure 5C:
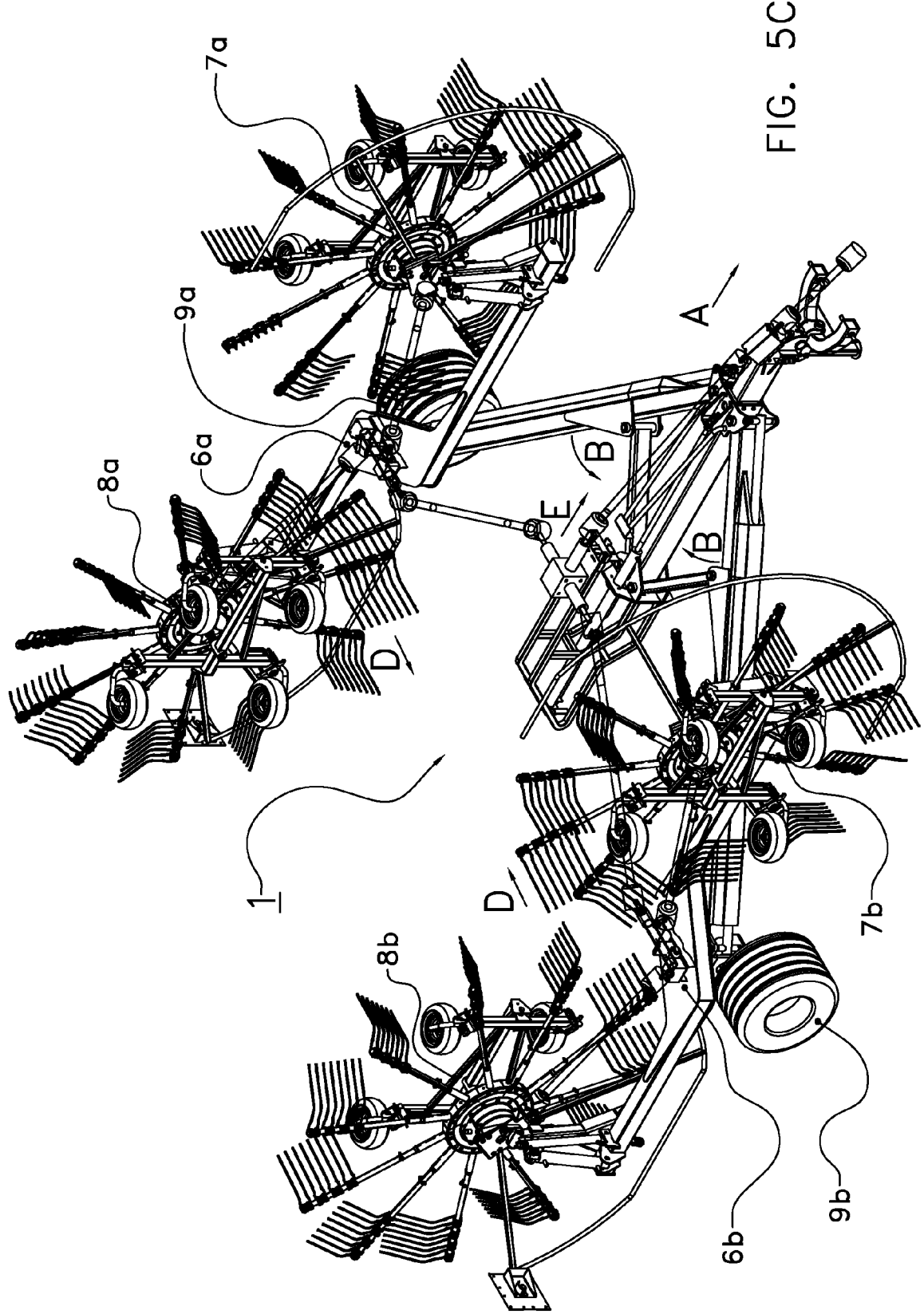

In the position of minimum working width of FIG. 5B, the slide 67 has reached a position just behind the end of the rails 66 and the slide 67 and the slide element 5 are still interconnected.

To pass to the transport position, the pivot arms 23*a,b* and 24*a,b* are operated in the then assumed operative position, in order to pivot the circular rakes 7*a,b* and 8*a,b* upwardly. The piston rod 71 is then extended and, via the position of FIG. 5C, the slide element 5 is forced to the front end of the main beam 2, just behind the coupling 3. The holding rods 10*a,b* then—in the transport position of FIG. 5D—extend forwardly along the main beam 2. The side arms 4*a,b* now make a small angle of approximately 7 degrees with the longitudinal centre line S. The inner ends of the side arms 4*a,b* are then brought as close as possible to the coupling 3, as far as possible in front of the support wheels 9*a,b*, so that a larger part of the weight thereof and of the tools carried by the side arms can be absorbed by the coupling 3 of the tractor 100 (FIG. 6, arrow F), which enhances the stability during transport and limits a yawing movement. In addition, this makes it possible to limit the length of the longitudinal girder.

In this case, the sole support points of the device 1 are the frame support wheels 9*a,b* and the hitch 3 to the tractor 100.

Figure 5D:
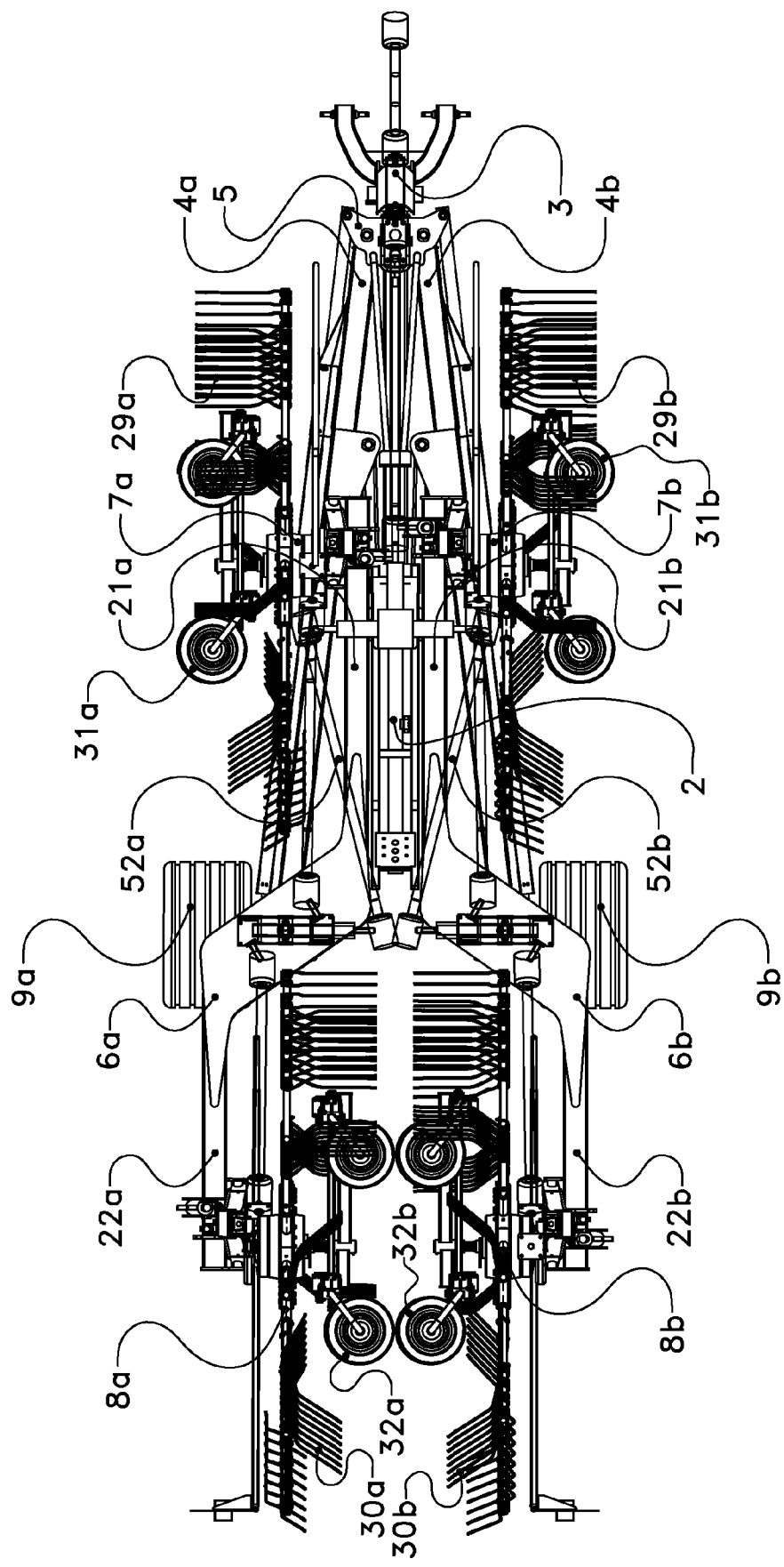
Figure 6:
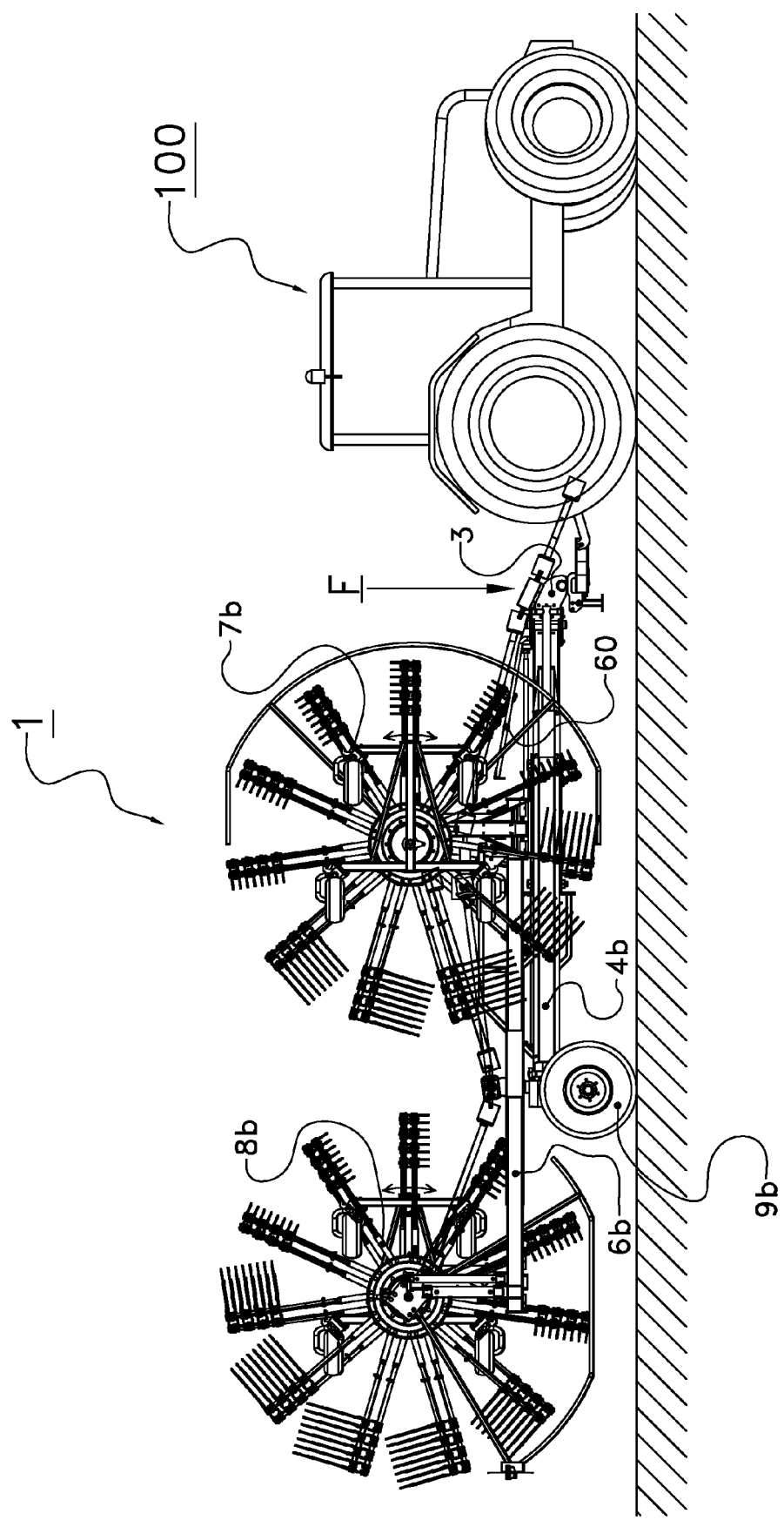
FIG. 6 shows a side view of the device of FIG. 1 in transport position behind a tractor.

FIG. 5D shows that, in the depicted transport position, the rake tines 29*a,b* of the circular rakes 7*a,b* are faced outwardly and the rake tines 30*a,b* of the circular rakes 8*a,b* are faced inwardly. This results in that the width at the rear end of the device in transport position can be limited to a minimum, in which situation the rake wheels 32*a,b* almost touch each other. This enhances the manoeuvrability in curves along stationary constructions, the risk of damage of the rake tines being reduced. The largest width of the device is defined by the frame support wheels 9*a,b*. The circular rakes 7*a,b*, whose tines 29*a,b* extend outwardly, are, as it were, screened by the support wheels 9*a,b* and the rear wheels of the tractor. The circular rakes 7*a,b* leave between them sufficient space for inter alia the main beam 2 and the side arms 4*a,b*.

When the side arms 4*a,b* are pivoted about the hinges 14*a,b*, the distance between the second and third gearboxes 53*a,b*, 55*c,d* and the longitudinal centre line S changes. This change should be absorbed by the telescopic secondary drive shafts 52*a,b*. However, telescopic shafts can do this only to a limited extent. By moving the ends of the secondary drive shafts also with respect to each other in a direction parallel to the longitudinal centre line S, the extent to which the shortening/lengthening is required can be limited.

For this purpose, in the embodiment of FIGS. 1, 2A-C, 3A and 3B, the slide 67, and consequently the central gearbox 50, is connected for collective movement to the slide element 5 via the rods 60. The main drive shaft 51 is then shortened in a telescopic manner. In this example, it has been decided not to take along the slide 67 over the entire trajectory of the slide element 5 and to limit the length of the rails 66, also with a view to the space available in the transport position (see FIGS. 5D and 6). For this purpose, at the arrival of the slide 67 at the end of the rails 66, the catch 64 abuts against the transverse rod 62, as a result of which the hook 63 is lifted. This means that the transverse section 61 is free from the hook 63 and the connection between the slide element 5 and the slide 67 is disengaged. The slide 67 remains behind at that position, while the slide element 5 can move further forwardly.

When the side arms 4*a,b* are again extended to an operative position, the piston rod 71 of the cylinder 70 is retracted and the slide element 5 again moves rearwardly. When the transverse section 61 abuts against the hook 63, the hook 63 is lifted to some extent and can engage again behind the transverse section 61. The transverse section 61 abuts against the stop surface 91 of the slide 67. The slide 67 is subsequently pushed rearwardly over the rails 66. In the meantime, the device 1 is moved rearwardly.

FIGS. 7A-C show an alternative suspension for the hub holder, see 19', which consists of two parts, viz. a U-shaped upper part 85 which comprises the mounting plate 83' for the rigid mounting of a (non-shown) satellite frame 6*a,b* and forms a mounting point for the hinge pins 81' and 82' for the hinge connection with the side arm 4*a,b* and the aligning rod 16*a,b*, respectively, and a component 86 which carries the hub 84 for the support wheel 9*a,b*. The upper part 85 and the component 86 are rotatable with respect to each other, direction H, about a centre line Z which coincides with the centre line of the hinge pin 81'. The upper part 85 and the component 86 are interconnected for mutual rotatability by means of a slide bearing 87. The rotation is effected by means of a cylinder 88, whose casing 89 is hingeably mounted to the upper part 85 and whose piston rod 90 is hingeably mounted to the component 86. The cylinders 88 can be operated independently of each other.

By operating the cylinder 88, direction I, the angle in the horizontal plane of the hub 84 and consequently of the wheel mounted thereon with respect to the longitudinal centre line S can be set, without the orientation of the satellite frame 6*a,b* being influenced. By means of this, when working on a terrain having a transverse slope, the tendency of the device 1 to deviate in downward direction can be compensated by giving at least the support wheel 9*a,b* located at the downward side a somewhat obliquely forward orientation. Furthermore, the folding in and out of the side arms 4*a,b* can be facilitated if both wheels 9*a,b* are then oriented so as to converge in the direction in which the device 1 is then travelling.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A haymaking device for displacing mown crop, comprising:
   a frame having a main beam extending in a longitudinal direction and defining a longitudinal centre line,
   at least a first side arm located on one side of the main beam,
   a first satellite frame which is rotatably connected to the first side arm about a substantially vertical centre line,
   a first pivot arm which, in the region of a first pivot arm connection, is pivotably connected to the first satellite frame about a substantially horizontal centre line for movement between an operative position and a transport position,
   a first crop processing tool which is mounted on the first pivot arm in such a manner that it can be rotatably driven about a first rotor centre line,
   a second pivot arm which, in the region of a second pivot arm connection, is pivotably connected to the first satellite frame about a substantially horizontal centre line for movement between an operative position and a transport position, a second crop processing tool which is mounted on the second pivot arm in such a manner that it can be rotatably driven about a second rotor centre line, wherein in the operative position of the first and second pivot arms, the first pivot arm connection is located at a larger horizontal distance from the longitudinal centre line than the first rotor centre line of the first crop processing tool and the second pivot arm connection is located at a smaller horizontal distance from the longitudinal centre line than the second rotor centre line of the second crop processing tool.

2. The device according to claim 1, wherein the first pivot arm extends substantially transversely to the longitudinal centre line.

3. The device according to claim 2, wherein the first pivot arm extends substantially at right angles to the longitudinal centre line.

4. The device according to claim 1, wherein the first crop processing tool is a crop displacing tool comprising a rake.

5. The device according to claim 1, wherein the first satellite frame is located at a level which differs from that of the first side arm.

6. The device according to claim 1, provided with an aligning rod for the first satellite frame, which aligning rod is connected to the main beam to align the first satellite frame with respect to the first side arm.

7. The device according to claim 1, wherein the first and second pivot arms are oriented in opposite directions.

8. The device according to claim 1, wherein the second pivot arm is located in front of the first pivot arm, when viewed in the direction of travel.

9. The device according to claim 1, wherein the first pivot arm connection is located at a larger horizontal distance from the longitudinal centre line than the second pivot arm connection.

10. The device according to claim 9, wherein the first satellite frame comprises a first satellite arm which extends rearwardly from the first pivot connection, and wherein the first pivot arm connection is mounted on the first satellite arm.

11. The device according to claim 10, wherein the first satellite arm extends substantially parallel to the longitudinal centre line.

12. The device according to claim 9, wherein the first satellite frame comprises a second satellite arm which extends forwardly from the first pivot connection, and wherein the second pivot arm connection is mounted on the second satellite arm.

13. The device according to claim 12, wherein the second satellite arm extends substantially parallel to the longitudinal centre line.

14. The device according to claim 12, wherein the first satellite arm is located at a larger horizontal distance from the longitudinal centre line than the second satellite arm.

15. The device according to claim 1, wherein the first satellite frame is mounted at the end of the first side arm.

16. The device according to claim 1, wherein the first satellite frame is provided with a support wheel which is located beside the first crop processing tool and at the end of the side arm.

17. The device according to claim 16, wherein the support wheel is located between the first and second crop processing tools, in the shadow of the second crop processing tool, when viewed in the direction of travel.

18. The device according to claim 17, wherein the support wheel is mounted to the first satellite frame so as to be rotatable about a substantially vertical centre line.

19. The device according to claim 18, wherein the centre line coincides with the centre line of the first rotational connection between the side arm and the satellite frame.

20. The device according to claim 18, further provided with setting mechanism for setting the angle of rotation of the support wheel with respect to the first satellite frame.

21. The device according to claim 16, wherein the device has, in its transport position, as sole support points a hitch for a tractor and the support wheel of the first satellite frame.

22. The device according to claim 1, wherein the first side arm is movable between a transport position, in which it extends substantially along the main beam, at a first angle to the main beam, and an operative position, in which the first side arm extends sidewardly from the main beam, at a second angle, larger than the first angle, wherein the device is further provided with an aligning rod for the first satellite frame, which aligning rod forms a parallelogram mechanism with the first side arm and the first satellite frame or a component which is rigidly connected thereto.

23. The device according to claim 1, wherein the horizontal distance between the first crop processing tool and the associated pivot arm connection is adjustable.

24. The device according to claim 23, wherein the associated pivot arm connection is adjustable by a telescopic design of the associated pivot arm.

* * * * *